US009106418B2

(12) United States Patent
Yoo

(10) Patent No.: US 9,106,418 B2
(45) Date of Patent: *Aug. 11, 2015

(54) METHOD OF DATA TRANSMISSION USING HARQ

(71) Applicant: LG Electronics Inc., Seoul (KR)

(72) Inventor: Hee Chul Yoo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/300,870

(22) Filed: Jun. 10, 2014

(65) Prior Publication Data

US 2014/0293917 A1    Oct. 2, 2014

Related U.S. Application Data

(63) Continuation of application No. 12/676,939, filed as application No. PCT/KR2008/005567 on Sep. 19, 2008, now Pat. No. 8,780,820.

(30) Foreign Application Priority Data

Oct. 4, 2007 (KR) .......................... 10-2007-0099950
Oct. 4, 2007 (KR) .......................... 10-2007-0099951
Feb. 5, 2008 (KR) .......................... 10-2008-0011901

(51) Int. Cl.
*H04W 4/00*    (2009.01)
*H04L 1/18*    (2006.01)
*H04L 1/12*    (2006.01)

(52) U.S. Cl.
CPC ............ *H04L 1/1812* (2013.01); *H04L 1/1874* (2013.01); *H04L 2001/125* (2013.01)

(58) Field of Classification Search
CPC ..................................................... H04W 84/08
See application file for complete search history.

(56) References Cited

U.S. PATENT DOCUMENTS

| 7,885,652 | B2 | 2/2011 | Umesh et al. |
| 2004/0029622 | A1 | 2/2004 | Laroia et al. |
| 2004/0223507 | A1 | 11/2004 | Kuchibhotla et al. |
| 2005/0250454 | A1* | 11/2005 | Sebire et al. ............... 455/67.11 |
| 2006/0258364 | A1 | 11/2006 | Usuda et al. |
| 2007/0047451 | A1 | 3/2007 | Lohr et al. |
| 2007/0116002 | A1 | 5/2007 | Nakamata |
| 2007/0300120 | A1* | 12/2007 | Kim et al. ..................... 714/749 |

(Continued)

FOREIGN PATENT DOCUMENTS

| CN | 1864361 A | 11/2006 |
| JP | 2006-222639 | 8/2006 |
| KR | 10-2007-0055004 A | 11/2005 |

OTHER PUBLICATIONS

LG Electronics, "Modifications on UL synchronous HARQ procedure", 3GPP TSG RAN WG1 #49bis, Orlando, Florida, Jun. 25-29, 2007, R1-072883.

(Continued)

*Primary Examiner* — Samina Choudhry
(74) *Attorney, Agent, or Firm* — Dentons US LLP

(57) ABSTRACT

A method of transmitting data using hybrid automatic repeat request (HARQ) includes transmitting an uplink data, receiving an ACK signal corresponding to the uplink data, and keeping the uplink data in a HARQ buffer after receiving the ACK signal until an uplink grant is received, the uplink grant comprising information on uplink resource assignment. Data can be more reliably transmitted.

12 Claims, 9 Drawing Sheets

(56) References Cited

U.S. PATENT DOCUMENTS

| | | | |
|---|---|---|---|
| 2008/0045255 A1* | 2/2008 | Revel et al. | 455/510 |
| 2008/0253326 A1 | 10/2008 | Damnjanovic | |
| 2008/0311923 A1* | 12/2008 | Petrovic et al. | 455/450 |
| 2009/0046793 A1 | 2/2009 | Love et al. | |
| 2009/0093218 A1 | 4/2009 | Umesh et al. | |
| 2010/0172295 A1 | 7/2010 | Sagfors et al. | |

OTHER PUBLICATIONS

Panasonic, "DL ACK/NACK modulation and UL HARQ behavior", 3GPP TSG RAN WG1 Meeting #50, Athens, Greece, Aug. 20-24, 2007, R1-073613.

ETSI, "Universal Mobile telecommunications System (UMTS); Evolved Universal terrestrial radio Access (E-UTRA) and Evolved Universal terrestrial Radio Access (E-UTRAN); Overall description; Stage 2", 3GPP TS 36.300 V8.2.0 Release 8, Oct. 2007.

3 GPP TSG RAN WG1#50, Athens, Greece, Aug. 20-24, 2007, "TDD HAEQ TIMING"; IPWireless, Nextwave Wireless.

Nokia Corporation et al.,"UL HARQ and PHICH", 3GPP Draft; R2-073911 UL HARQ and PHICH, 3rd Generation Partnership Project (3GPP), Mobile Competence Centre; 650, Route Deslucioles; F-06921 Sophia-Antipolis Cedex; France, vol. RAN WG2, No. Shanghai, China; Oct. 2, 2007, XP050136565.

Alcatel-Lucent; UL AM data confirmation based on HARQ ACK in LTE, 3GPP Draft; R2-074353 UL AM Data Confirmation Based on HARQ ACK in LTE AF, 3rd Generation Partnership Project (3GPP), Mobile Completence Centre; 650, Route Des Lucioles; F-06921 Sophia-Antipolis Cedex, France, vol. RAN WG2, No. Shanghai, China; Oct. 1, 2007, XP050136926.

Ericsson: "HARQ-ARQ Interactions", 3GPP DRAFT; R2-061861, 3RD Generation Partnership Project (3GPP), Mobile Competence Centre; 650, Route Des Lucioles; F-06921 Sophia-Antipolis Cedex; France, vol. RAN WG2, No. Cannes, France; Jun. 21, 2006, XP050141898.

* cited by examiner

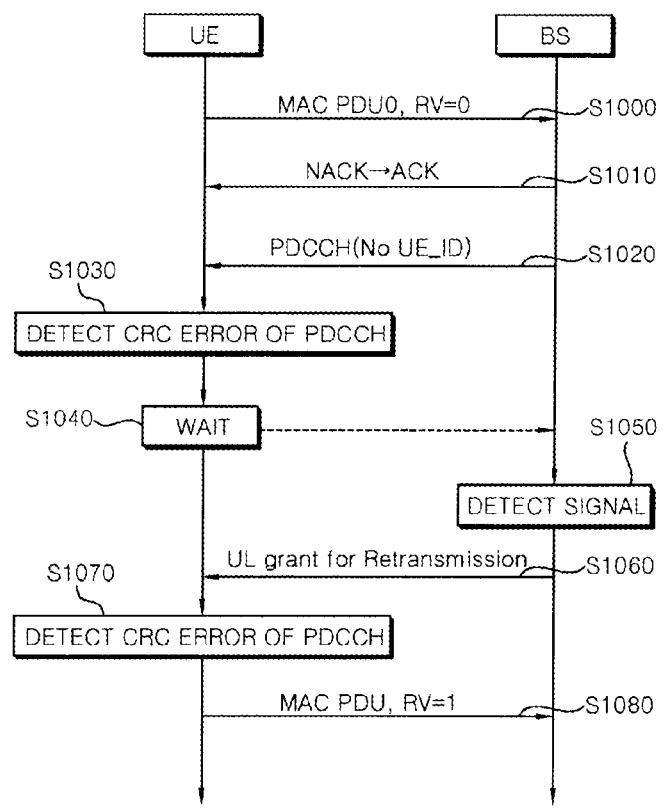

METHOD OF DATA TRANSMISSION USING HARQ

This application is a Continuation of, and claims the benefit of, U.S. patent application Ser. No. 12/676,939, filed Mar. 8, 2010, which is a national phase entry of International Application No. PCT/KR2008/005567, filed Sep. 19, 2008, and claims priority to Korean Patent Application No. 10-2007-0099951, filed Oct. 4, 2007, Korean Patent Application No. 10-2007-0099950, filed Oct. 4, 2007, and Korean Patent Application No. 10-2008-0011901, filed Feb. 5, 2008, all of which are incorporated by reference for all purposes as if fully set forth herein.

TECHNICAL FIELD

The present invention relates to wireless communications, and more particularly, to a data transmission method using HARQ.

BACKGROUND ART

With the demand on a high-speed, large-volume data communication system for processing and transmitting a variety of information such as radio data as well as providing voice-oriented services, there is a need for developing a technique for transmitting large-volume data through the wireless communication network whose capacity is similar to that of the wired communication network. Therefore, an error handling method is essential for minimizing data loss and for increasing system transmission efficiency.

Examples of the error handling method include a forward error correction (FEC) scheme and an automatic repeat request (ARQ) scheme. In the FEC scheme, a receiver corrects an error by appending an extra error correction code to information bits. In the ARQ scheme, when a received signal has an error, a transmitter corrects the error by retransmitting data. A hybrid ARQ (HARQ) scheme is a combination of the FEC scheme and the ARQ scheme.

According to the HARQ scheme, the receiver basically attempts error correction when data is received, and determines data retransmission by using an error detection code. For error detection, the transmitter can append a cyclic redundancy check (CRC) as the error detection code to the data to be transmitted. The receiver can detect an error of the received data by using the appended CRC. If no error is detected by the receiver by using the CRC, the receiver feeds back an acknowledgement (ACK) signal as a response signal to the transmitter. Otherwise, upon detecting an error from the received data, the receiver transmits a negative-acknowledgement (NACK) signal as a response signal to the transmitter. That is, the ACK/NACK signal is feedback on successful or unsuccessful reception of uplink data. The transmitter retransmits data upon receiving the NACK signal. Such a HARQ operation is performed in a physical layer.

The HARQ operation is performed by at least one HARQ entity included in a user equipment (UE) or a base station (BS). The HARQ entity allows continuous data transmission while waiting for the feedback (i.e., the ACK signal or the NACK signal) on successful or unsuccessful reception of previous data transmission. In an uplink scenario, the UE receives resource assignment information from the BS, and when the UE transmits associated HARQ information to the HARQ entity, the HARQ entity performs a HARQ process indicated by the HARQ information. To support the HARQ entity, the UE may operate a plurality of parallel HARQ processes.

Hereinafter, a downlink denotes a communication link from the BS to the UE, and an uplink denotes a communication link from the UE to the BS. The uplink transmission and the HARQ operation are performed in the following manner. The BS transmits scheduling information to the UE through a physical downlink control channel (PDCCH) that is a downlink control channel. Then, according to the scheduling information, the UE transmits data to the BS through a physical uplink shared channel (PUSCH) that is an uplink data channel. When the UE transmits the data to the BS, the BS transmits an ACK/NACK signal to the UE through an ACK/NACK channel (i.e., a physical HARQ indicator channel (PHICH)).

If an error occurs in the ACK/NACK channel, the NACK signal may be erroneously transmitted instead of the ACK signal or vice versa. In this case, the UE cannot properly perform retransmission or new transmission. In addition, if an error occurs in the PDCCH, the UE cannot know scheduling information and thus cannot properly perform uplink transmission. As such, a control channel error results in retransmission of unnecessary data or non-transmission of necessary data, which leads to performance deterioration in data transmission.

Accordingly, there is a need for a data transmission method using HARQ considering control channel errors.

DISCLOSURE OF INVENTION

Technical Problem

The present invention provides a data transmission method using HARQ.

Technical Solution

According to an aspect of the present invention, a method of transmitting data using hybrid automatic repeat request (HARQ) is provided. The method includes transmitting an uplink data, receiving an ACK signal corresponding to the uplink data, and keeping the uplink data in a HARQ buffer after receiving the ACK signal until an uplink grant is received, the uplink grant comprising information on uplink resource assignment.

According to another aspect of the present invention, a method of transmitting data using HARQ is provided. The method includes transmitting an uplink data, receiving an ACK/NACK signal for the uplink data, the ACK/NACK signal being the feedback on the successful or unsuccessful reception of the uplink data, receiving an uplink grant on a downlink control channel, the uplink grant comprising information on uplink resource assignment, and retransmitting the uplink data regardless of information of the ACK/NACK signal when the uplink grant indicates a retransmission.

According to yet another aspect of the present invention, a method of transmitting data using HARQ is provided. The method includes transmitting an uplink data, receiving an ACK/NACK signal corresponding to the uplink data, keeping the uplink data in a HARQ buffer after receiving the ACK/NACK signal, receiving an uplink grant on a downlink control channel, the uplink grant comprising information on uplink resource assignment, and retransmitting the uplink data or transmitting a new uplink data according to what the uplink grant indicates.

Advantageous Effects

According to the present invention, even if a cyclic redundancy check (CRC) error occurs in a physical downlink control channel (PDCCH) that is a downlink control channel, data can be promptly retransmitted to correct the error of the PDCCH by using a protocol agreed between a user equipment and a base station without having to repeat data retransmission. In particular, the user equipment can more correctly handle the CRC error of the PDCCH such that data can be more reliably transmitted.

BRIEF DESCRIPTION OF THE DRAWINGS

FIG. 12 is a flow diagram showing a data transmission method using HARQ according to another embodiment of the present invention.

MODE FOR THE INVENTION

Figure 1:
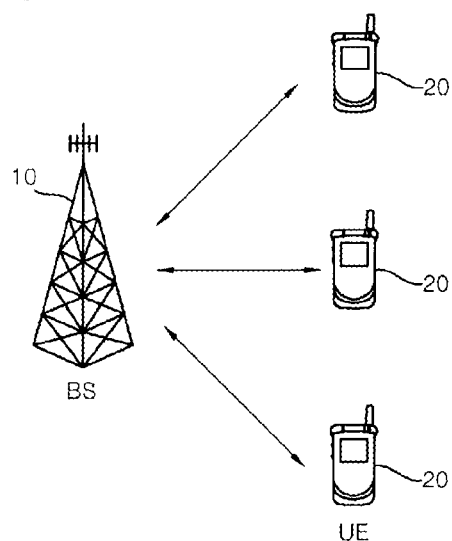
FIG. 1 shows a wireless communication system.

The present invention will now be described more fully with reference to the accompanying drawings, in which exemplary embodiments of the invention are shown. The invention may, however, be embodied in many different forms and should not be construed as being limited to the embodiments set forth herein. Rather, these embodiments are provided so that this disclosure will be thorough and complete, and will fully convey the concept of the invention to those skilled in the art. In the drawings, the thicknesses of layers and regions are exaggerated for clarity. Like reference numerals in the drawings denote like elements.

FIG. 1 shows a wireless communication system. The wireless communication system can be widely deployed to provide a variety of communication services, such as voices, packet data, etc.

Referring to FIG. 1, the wireless communication system includes a base station (BS) 10 and at least one user equipment (UE) 20. The UE 20 may be fixed or mobile, and may be referred to as another terminology, such as a mobile station (MS), a user terminal (UT), a subscriber station (SS), a wireless device, etc. The BS 10 is generally a fixed station that communicates with the UE 20 and may be referred to as another terminology, such as a node-B, a base transceiver system (BTS), an access point, etc. There are one or more cells within the coverage of the BS 10.

A downlink represents a communication link from the BS 10 to the UE 20, and an uplink represents a communication link from the UE 20 to the BS 10. In the downlink, a transmitter may be a part of the BS 10, and a receiver may be a part of the UE 20. In the uplink, the transmitter may be a part of the UE 20, and the receiver may be a part of the BS 10.

Downlink and uplink transmissions can be made using different multiple access schemes. For example, orthogonal frequency division multiple access (OFDMA) may be used for downlink transmission, and single carrier-frequency division multiple access (SC-FDMA) may be used for uplink transmission.

There is no restriction on the multiple access schemes used in the wireless communication system. The multiple access schemes may be based on code division multiple access (CDMA), time division multiple access (TDMA), frequency division multiple access (FDMA), single-carrier FDMA (SC-FDMA), orthogonal frequency division multiple access (OFDMA), or other well-known modulation schemes. In these modulation schemes, signals received from multiple users are demodulated to increase capacity of the communication system. For clarity, the OFDMA-based wireless communication system will be described hereinafter.

The OFDM scheme uses a plurality of orthogonal subcarriers. Further, the OFDM scheme uses an orthogonality between inverse fast Fourier transform (IFFT) and fast Fourier transform (FFT). The transmitter transmits data by performing IFFT. The receiver restores original data by performing FFT on a received signal. The transmitter uses IFFT to combine the plurality of subcarriers, and the receiver uses FFT to split the plurality of subcarriers. According to the OFDM scheme, complexity of the receiver can be reduced in a frequency selective fading environment of a broadband channel, and the spectral efficiency can be improved through selective scheduling in a frequency domain by utilizing channel characteristics which are different from one subcarrier to another. An OFDMA scheme is an OFDM-based multiple access scheme. According to the OFDMA scheme, a radio resource can be more efficiently used by allocating different subcarriers to multiple users.

Figure 2:
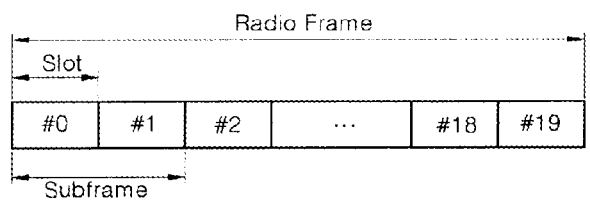
FIG. 2 shows an exemplary structure of a radio frame.

FIG. 2 shows an exemplary structure of a radio frame.

Referring to FIG. 2, the radio frame includes 10 subframes. One subframe includes two slots. The subframe is a basic unit of data transmission. Downlink or uplink scheduling is performed in a subframe unit. One slot may include a plurality of OFDM symbols in a time domain and at least one subcarrier in a frequency domain. One slot may include 7 or 6 OFDM symbols.

The radio frame structure is shown for exemplary purposes only. Thus, the number of subframes included in the radio frame, the number of slots included in the subframe, and the number of OFDM symbols and subcarriers included in the slot can change variously.

Figure 3:
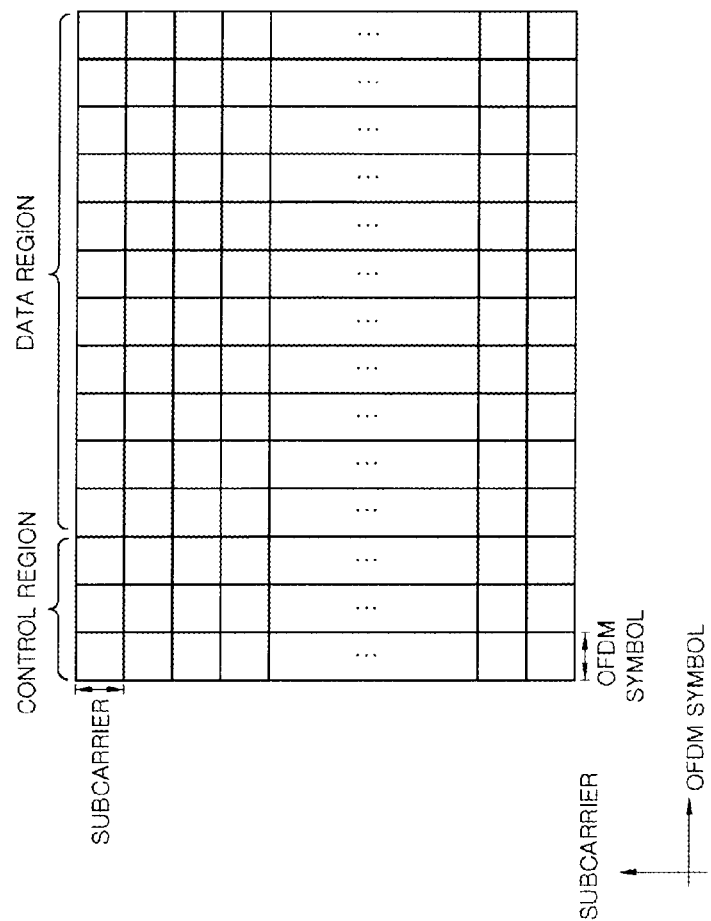
FIG. 3 is an exemplary structure of a subframe.

FIG. 3 is an exemplary structure of a subframe.

Referring to FIG. 3, one subframe includes 14 OFDM symbols in total. In a frequency domain, one OFDM symbol includes one or more subcarriers. One subcarrier and one OFDM symbol are also referred to as a resource element. In a downlink scenario, the number of subcarriers included in one OFDM symbol differs from one UE to another. For example, in an FDMA system, the number of subcarriers included in one OFDM symbol is equal to the number of subcarriers for a frequency bandwidth assigned to a UT.

A downlink subframe can be divided into 2 parts, that is, a control region and a data region. First 3 OFDM symbols can be assigned to the control region, and the remaining 11 OFDM symbols can be assigned to the data region. The number of OFDM symbols assigned to the control channel and the data channel on one subframe may be determined variously.

The control region is used to transmit only a control signal and is assigned to a control channel. The data region is used to transmit data and is assigned to a data channel. The control channel and the data channel can be configured with one subframe.

The control signal includes a plurality of signals other than the user data. That is, the control signal includes an acknowledgement (ACK)/negative-acknowledgement (NACK) signal, a channel quality indicator (CQI), a preceding matrix index (PMI), a rank indicator (RI), etc.

The downlink data channel can be referred to as a physical downlink shared channel (PDSCH) The control channel can be referred to as an physical downlink control channel for transmitting scheduling information. The scheduling information for a physical uplink shared channel (PUSCH) is referred to as an uplink grant. The scheduling information for the PDSCH is referred to as a downlink grant.

The uplink grant is information regarding radio resources allocated to a UE in order to transmit/receive a Media Access Control (MAC) protocol data unit (PDU) which is MAC-layer data. When the uplink grant is transmitted for a specific UE through the PDCCH, a BS transmits a user equipment_identification (UE_ID) as an identifier of the UE. Then, the UE determines whether its UE_ID exists in the PDCCH, and thus can know whether the uplink grant is transmitted for the UE. The UE_ID may also be referred to as cell-radio network temporary identifier (C-RNTI).

Table 1 below shows exemplary parameters constituting a field of the uplink grant.

TABLE 1

| Field | Bits | Comment |
|---|---|---|
| Format | 1 | Indicates UL or DL information. FFS if Implicitly indicated as part of the CRC. |
| RB assignment | $\lceil \log_2(N_{RB}^{UL}(N_{RB}^{UL}+1)/2) \rceil$ | Indicates the resource blocks the UE shall transmit upon |
| MAC ID | 16 | Implicitly encoded in the CRC |
| Transport format | 4-7 | Transport block size, modulation scheme |
| Retransmission sequence number | 1-2 | Doubles as now data indicator (=0 indicates new data, >0 indicates retransmission) and redundancy number. May be possible to reduce to 1 bit if the RV is linked to the transmission attempt number |
| TPC | 2-4 | Power control of PUSCH |
| Cyclic shift for DMRS | 3 | The cyclic shift to used for generation of the demodulation reference signal. Present at least in case of spatial multiplexing. |
| UL index (TDD) | | Used to indicate which uplink subframe(s) the grant is valid for. Necessary for TDD only. |

Referring to Table 1, the parameters constituting the uplink grant filed include "format", "resource block (RB) assignment", "MAC ID", "transport format", "retransmission sequence number (RSN)", "transmission power control (TPC)", "cyclic shift for demodulation reference signal (DMRS)", and "uplink (UL) index (in case of using a time division duplex (TDD) system). The RB assignment information denotes resource assignment information in a special case where resources are allocated in an RB unit. Thus, the RB assignment information may also be referred to as resource assignment information. Hereinafter, the RB assignment information is referred to as resource assignment information.

The resource assignment information denotes information regarding assignment of radio resources for uplink data or downlink data. The BS manages a plurality of UEs, some of which may transmit and receive data while the remaining of which may not transmit and receive data. The UEs transmitting/receiving data have to be assigned with radio resources whereas the remaining UEs do not have to be assigned with radio resources. The uplink grant may not be transmitted to the remaining UEs to which the radio resources do not have to be assigned.

The RSN is an indicator indicating whether the uplink grant is for retransmission of the previous data. The RSN consists of at least one bit to indicate whether to retransmit the data. If the RSN is 1-bit information, '1' may indicate 'retransmission of previous data' and '0' may indicate 'transmission of new data'.

Hereinafter, a UL grant (NULL) denotes an uplink grant whose resource assignment information is set to NULL, that is, an uplink grant not assigned with an uplink radio resource. The BS can transmit the uplink grant or the UL grant (NULL) to the UE. Optionally, Void or Default may be used instead of NULL.

A field of the UL grant (NULL) is configured as shown in Table 2 below.

TABLE 2

| Field | Bits | Comment |
|---|---|---|
| Format | 1 | Indicates UL or DL information. FFS if implicitly indicated as part of the CRC. |
| RB assignment | $\lceil \log_2(N_{RB}^{UL}(N_{RB}^{UL}+1)/2) \rceil$ | Indicates the resource blocks the UE shall transmit upon. |
| MAC ID | 16 | Implicitly encoded in the CRC |

Referring to Table 2, the parameters constituting the field of the UL grant (NULL) include "format", "RB assignment", and "MAC ID". In comparison with the parameters of the uplink grant field of Table 1 above, the UL grant (NULL) does not include "transport format", "RSN", "TPC", "cyclic shift for DMRS", and "UL index (TDD). Table 2 above is provided for exemplary purposes only, and thus "RB assignment" may also be excluded from the field of the UL grant (NULL).

Except for a case where an ACK/NACK signal itself is lost, an error in the ACK/NACK channel is detected in the following two cases. First, a BS transmits a NACK signal but a UE erroneously receives an ACK signal, which is referred to as a NACK-to-ACK error. Second, the BS transmits an ACK signal but the UE erroneously receives a NACK signal, which is referred to as an ACK-to-NACK error.

A data transmission method using HARQ when there is no error in the PDCCH will be first described. In this case, whether an error occurs in the ACK/NACK channel may be determined depending on an uplink grant received through the PDCCH.

Figure 4:
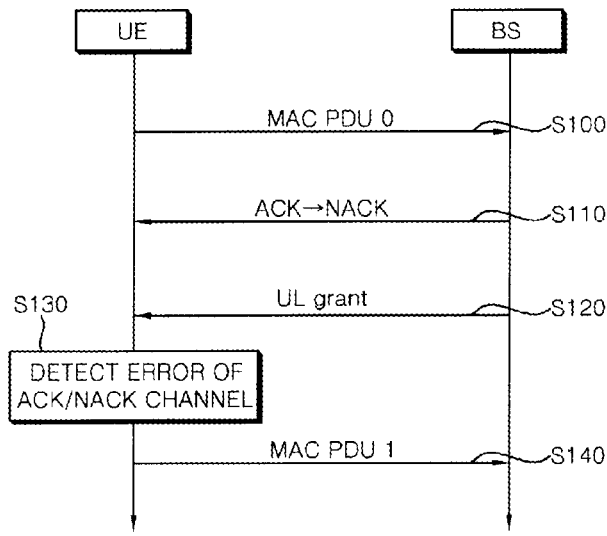
FIG. 4 is a flow diagram showing a data transmission method using HARQ according to an embodiment of the present invention.

FIG. 4 is a flow diagram showing a data transmission method considering an error of an ACK/NACK channel according to an embodiment of the present invention. Hereinafter, a MAC PDU is one of data blocks, and may be referred to as another terminology that can indicate uplink data transmitted by a UE to a BS.

Referring to FIG. 4, the UE transmits a MAC PDU_0 to the BS (step S100). The BS transmits an ACK signal to the UE through the ACK/NACK channel (step S110). It will be assumed herein that an ACK-to-NACK error occurs and thus the UE erroneously receives a NACK signal instead of the ACK signal. Meanwhile, in order to receive next data (i.e., a MAC PDU_1) from the UE, the BS transmits a UL grant through a PDCCH (step S120). The UL grant is resource assignment information for assigning radio resources to be used in transmission of the MAC PDU_1 that is next data of the MAC PDU_0. In this case, a UE_ID of the UE is transmitted together with the UL grant.

For each HARQ process, the BS sets a flag in every scheduling time (i.e., transmission time interval (TTI)) in preparation for retransmission of the UL grant. The flag is indication information indicating a status of resource assignment information of the previously transmitted UL grant. The flag is updated according to Equation 1 below.

MathFigure 1

Flag=1, if resource is allocated

Flag=0, if resource is allocated [Math. 1]

That is, to receive new data from the UE, the BS sets the flag to '1' when the UL grant is transmitted by including resource assignment information, and sets the flag to '0' when the BS transmits a UL grant (NULL) to the UE without including resource assignment information.

The UE detects the ACK-to-NACK error (step S130). Since the UE has received the UL grant for new transmission after receiving the NACK signal, the UE can detect the ACK-to-NACK error. This is because the UL grant for new transmission is transmitted when the previously transmitted ACK/NACK signal is an ACK signal. Therefore, the UE determines the NACK signal as the ACK signal, and transmits the MAC PDU_1 to the BS (step S140). Instead of retransmitting the MAC PDU_0, the UE transmits the new MAC PDU_1 by using radio resources according to the UL grant.

As described above, whether the BS will assign radio resources to the UE by using the UL grant depends on successful/unsuccessful reception of a MAC PDU of the BS. That is, when the MAC PDU is successfully received, that is, when the BS transmits an ACK signal for the MAC PDU to the UE, the BS assigns a new radio resource for a new MAC PDU transmission. Otherwise, if the MAC PDU is unsuccessfully received, that is, when the BS transmits a NACK signal for the MAC PDU to the UE, the BS transmits a UL grant (NULL) or a UL grant for retransmission without assigning an additional radio resource to the UE.

Figure 5:
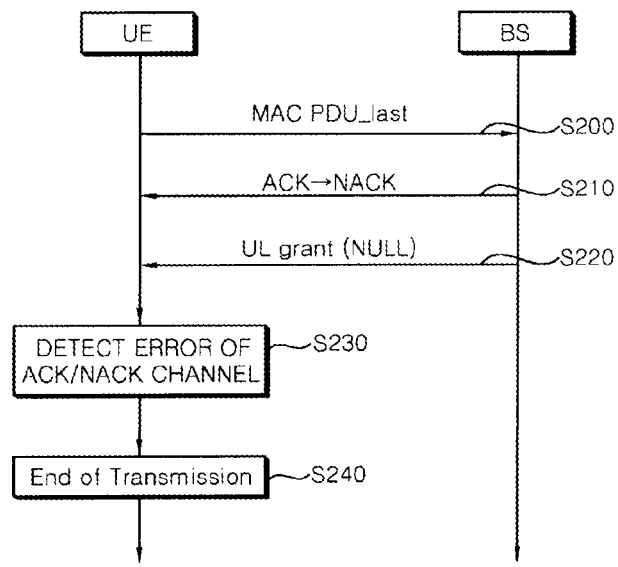
FIG. 5 is a flow diagram showing a data transmission method using HARQ according to another embodiment of the present invention.

FIG. 5 is a flow diagram showing a data transmission method using HARQ according to another embodiment of the present invention.

Referring to FIG. 5, a UE transmits a MAC PDU_last to a BS (step S200). The MAC PDU_last denotes last data which is transmitted by the UE to the BS. When there is no data to be transmitted to the BS at a next transmission time point, currently transmitted data is the last data. For a HARQ operation performed by each HARQ process, when there is no data to be transmitted in any one of HARQ processes, the currently transmitted data may be the MAC PDU_last. An ACK-to-NACK error occurs when BS transmits an ACK signal to the UE, and thus the UE erroneously receives an NACK signal (step S210).

The BS transmits a UL grant (NULL) (step S220). When the BS successfully receives the MAC PDU_last, that is, when the ACK signal is received, radio resource assignment for the UE is no longer necessary. Therefore, the BS transmits the UL grant (NULL) to report the completion of data transmission. The UE detects the ACK-to-NACK error (step S230). Upon receiving the UL grant (NULL) from the BS, the UE can detect an error of the ACK/NACK channel. This is because, if the ACK/NACK signal for the MAC PDU_last is a NACK signal, neither the UL grant nor the UL grant (NULL) will be transmitted by the BS. The UE ends data communication with the BS (step S240).

In uplink data transmission, collision may occur when a plurality of UEs transmit data. For example, assume that a first UE transmits first data by using first resource assignment information, and the BS transmits an ACK signal in response to the first data. In this case, if a priority of resource assignment changes, the BS may re-assign the first resource assignment information to a second UE instead of assigning a radio resource for the first UE. When an ACK-to-NACK error occurs in the first UE, the first UE retransmits data by using the previously assigned first resource assignment information, and the second UE transmits its data by also using the first resource assignment information. In this case, data of the first UE and data of the second UE are transmitted through the same radio resource, resulting in occurrence of interference. This may cause a large bit error rate (BER).

Figure 6:
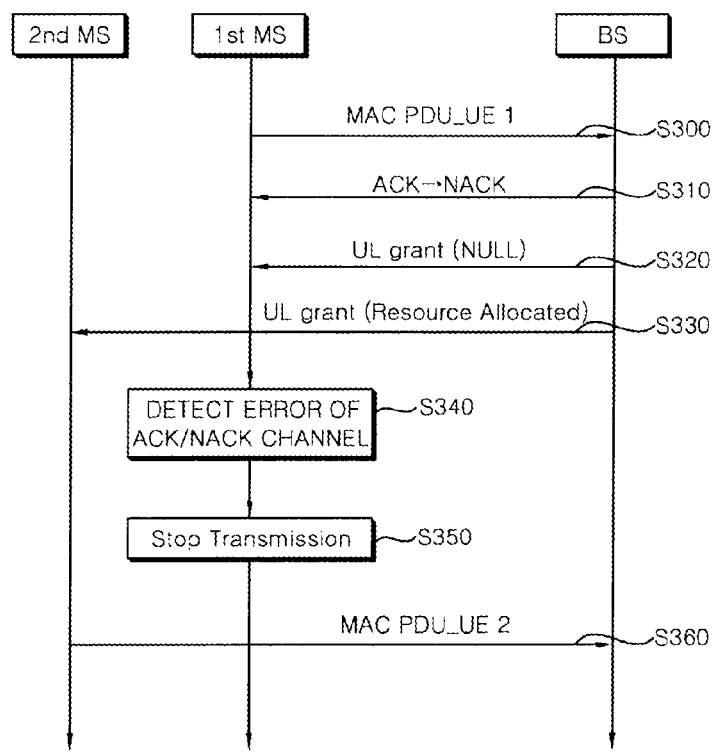
FIG. 6 is a flow diagram showing a data transmission method using HARQ according to another embodiment of the present invention.

FIG. 6 is a flow diagram showing a data transmission method using HARQ according to another embodiment of the present invention.

Referring to FIG. 6, a first UE transmits a MAC PDU_UE1 to a BS (step S300). An ACK-to-NACK error occurs when the BS transmits an ACK signal in response to the MAC PDU_UE1, and thus the UE erroneously receives a NACK signal (step S310). Meanwhile, a priority of resource assignment changes from the first UE to a second UE. Thus, the BS does not assign resources to the first UE. Instead, the BS transmits a UL grant (NULL) (step S320). The BS transmits a UL grant by allocating radio resources to the second UE (step S330).

The first UE detects an ACK-to-NACK error (step S340). Once the UE receives the UL grant (NULL), the UE can know that a previously received NACK signal is erroneously received instead of an ACK signal and thus can know that the ACK-to-NACK error occurs. In addition, since the MAC PDU_UE1 is not last data of the first UE in continuous data transmission, if the BS transmits the UL grant (NULL) for the first UE, it means that resources are assigned to the second UE not to the first UE.

Therefore, the first UE suspends transmission of next data (step S350). This is because data collision with the second UE may occur when the first UE transmits data by using a radio resource assigned to the second UE. Scheduling of any one of the UEs is suspended to avoid collision among a plurality of UEs existing within the same cell. The second UE transmits a MAC PDU_UE2 by using the assigned radio resource (step S360).

Now, a method of determining an error of an ACK/NACK channel will be described in a case where a UE receives an ACK signal but cannot successfully receive a valid UL grant since an error occurs in a PDCCH (this case is referred to as a suspension state).

First, the UE determines that there is no error in the ACK/NACK channel in the following three cases.

Case-1) The UE receives a UL grant for new transmission before the number of transmissions reaches a maximum transmission number (hereinafter, a max Tx number). The UE has a transmission trial number (TTN). The TTN denotes the number of transmissions performed for a MAC PDU currently stored in a buffer. The UE increments the TTN by 1 whenever transmission is made for the MAC PDU currently stored in the buffer. The buffer is flushed if transmission of the same data is repeated by the max Tx number due to suspension.

Case-2) The UE waits for receiving a UL grant for new data transmission until the TTN reaches the max Tx number of the new data but fails in receiving the UL grant for new data transmission even at a time point which an ACK/NACK signal is received. This is a case where the BS has already received last data of the UE or has already transmitted an ACK signal and a UL grant (NULL) due to UL grant assignment of another UE.

Case-3) The UE receives the UL grant (NULL) from the BS.

Next, the UE determines that there is an error in the ACK/NACK channel when the UE cannot successfully receive the UL grant after receiving the ACK signal in the following two cases.

Case-1) The UE waits for receiving a UL grant until a TTN reaches a max Tx number of the new data and receives the UL grant for retransmission before the TTN reaches the max Tx number. This is a case where the BS requests retransmission when the BS detects that the UE is not retransmitting data.

Case-2) An error occurs in data transmitted by the UE, and thus the UE receives a UL grant (or UL grant for retransmission) when the TTN reaches the max Tx number after waiting for receiving the UL grant.

As such, when the UE is in the suspension state, the UE cannot receive the ACK/NACK signal from the BS. Thus, in order to allow retransmission of the MAC PDU after the suspension state is released, the UE has to receive the UL grant through the PDCCH.

Figure 7:
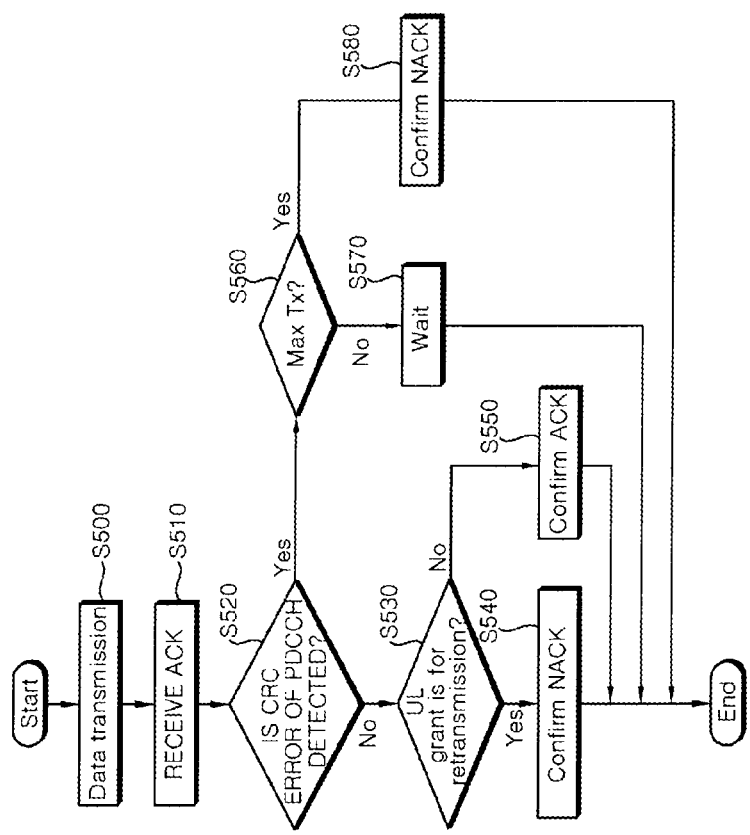
FIG. 7 is a flowchart showing a data transmission method using HARQ according to an embodiment of the present invention.

FIG. 7 is a flowchart showing a data transmission method using HARQ according to an embodiment of the present invention.

Referring to FIG. 7, a UE transmits uplink data to a BS (step S500). The UE receives an ACK signal from the BS in response to the transmission of the uplink data (step S510). The UE tries to detect a CRC error of the PDCCH received after transmitting the uplink data (step S520). If the CRC error of the PDCCH is not detected and the UE correctly receives the PDCCH, the UE determines whether a UL grant is for retransmission (step S530). A transmission state indicator included in the UL grant may be used to indicate whether the UL grant is for retransmission or new transmission. In this case, the UE keeps the uplink data in a buffer and does not empty the buffer.

If the UL grant is for retransmission, the UE confirms the received ACK signal as the NACK signal (step S540). That is, the UE confirms that an ACK/NACK signal for the uplink data stored in the buffer is the NACK signal. If the UL grant is not for retransmission, that is, if the transmission state indicator indicates new transmission, the UE confirms the received ACK signal as the ACK signal (step S550). That is, irrespective of ACK/NACK signal information (i.e., whether the ACK/NACK signal is an ACK signal or a NACK signal), a UL grant to be transmitted next is prioritized in determining retransmission or new transmission.

If the CRC error of the PDCCH is detected, it is determined whether the UL grant transmitted through the PDCCH is a UL grant which has been retransmitted a number of times corresponding to a max Tx number (step S560). If the determination result shows that the UT, grant is not retransmitted the number of times corresponding to the max Tx number, the UE waits for a certain period of time (step S570). Otherwise, the received ACK signal is confirmed as the NACK signal (step S580).

Figure 8:
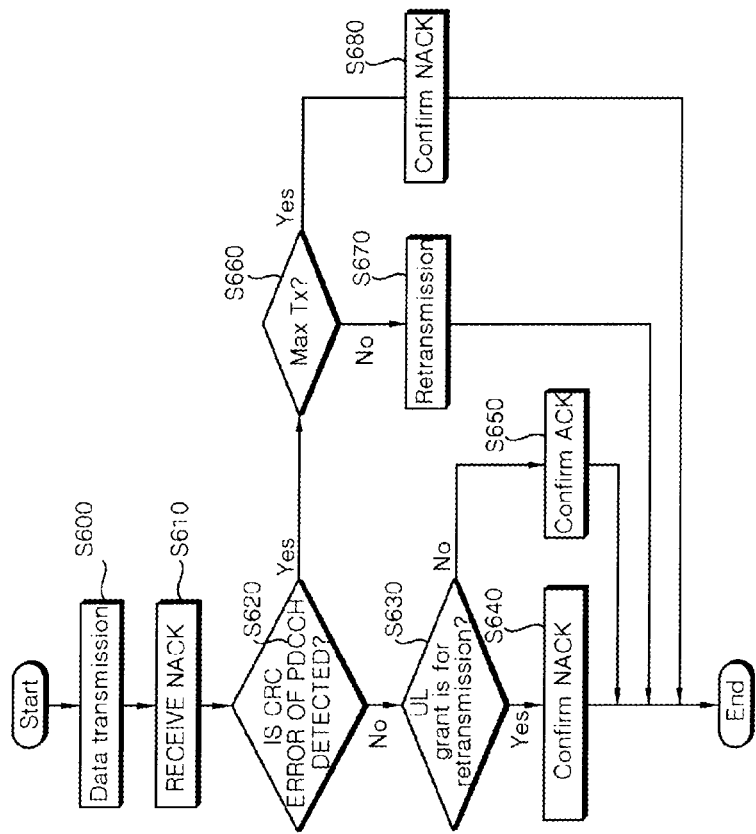
FIG. 8 is a flowchart showing a data transmission method using HARQ according to another embodiment of the present invention.

FIG. 8 is a flowchart showing a data transmission method using HARQ according to another embodiment of the present invention.

Referring to FIG. 8, a UE transmits uplink data to a BS (step S600). The UE receives a NACK signal as a retransmission request from the BS in response to the transmission of the uplink data (step S610). The UE tries to detect a CRC error of the PDCCH received after transmitting the uplink data (step S620). If the CRC error of the PDCCH is not detected and the UE correctly receives the PDCCH, the UE determines whether a UL grant is for retransmission (step S630).

If the UL grant is for retransmission, the UE confirms the received NACK signal as the NACK signal (step S640). If the UL grant is not for retransmission, that is, if the transmission state indicator indicates new transmission, the UE confirms the received NACK signal as the ACK signal (step S650). That is, irrespective of ACK/NACK signal information, a UL grant to be transmitted next is prioritized in determining retransmission or new transmission.

If the CRC error of the PDCCH is detected (i.e., if the UE is in a suspension state), while incrementing a transmission trial number (TTN) by 1, the UE determines an error of an ACK/NACK signal by using a received UL grant until the TTN reaches a max Tx number (step S660). If a UL grant for retransmission is received before the TTN reaches the max Tx number, the UE retransmits a MAC PDU stored in a buffer (step S670). If the UL grant for retransmission is not received before the TTN reaches the max Tx number, the received NACK signal is confirmed as the NACK signal (step S680). As such, signaling of the PDCCH may be performed to allow data retransmission in the suspension state. This is because the ACK/NACK signal cannot be transmitted from the BS.

Figure 9:
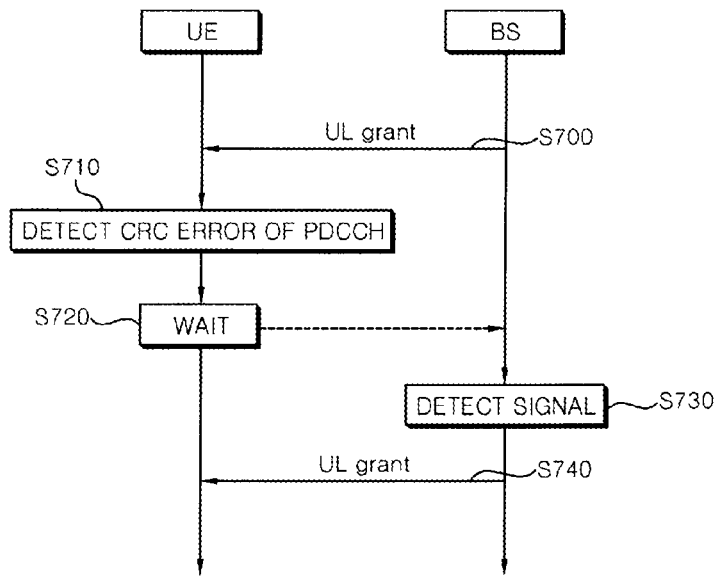
FIG. 9 is a flow diagram showing a data transmission method using HARQ according to another embodiment of the present invention.

FIG. 9 is a flow diagram showing a data transmission method using HARQ according to another embodiment of the present invention.

Referring to FIG. 9, a BS transmits a UL grant on a PDCCH (step S700). A UE detects a CRC error of the PDCCH (step S710). Upon detecting the CRC error of the PDCCH, the UE waits without determining a corresponding error of the ACK/NACK channel (step S720). That is, when the CRC error occurs in the PDCCH, the UE suspends data retransmission or new data transmission.

The BS tries to detect a signal transmitted from the UE (step S730). If the signal detection result shows that a measured energy strength of the uplink data is below a specific threshold, it is determined that the UE waits for a certain period of time while suspending data transmission since the CRC error occurs in the PDCCH. Signal detection can be achieved through NULL Tx detection of uplink data. In addition, various other well-known techniques may also be used for signal detection.

The BS retransmits the UL grant (step S740). Since the CRC error occurs in the PDCCH, the BS checks for a flag to determine whether to transmit a UL grant for new data transmission or a UL grant for retransmission.

When the CRC error occurs in the PDCCH, the UE suspends data transmission and the BS retransmits the UL grant at a next transmission period upon detecting the transmission suspension. Accordingly, prompt and effective error handling can be achieved.

Figure 10:
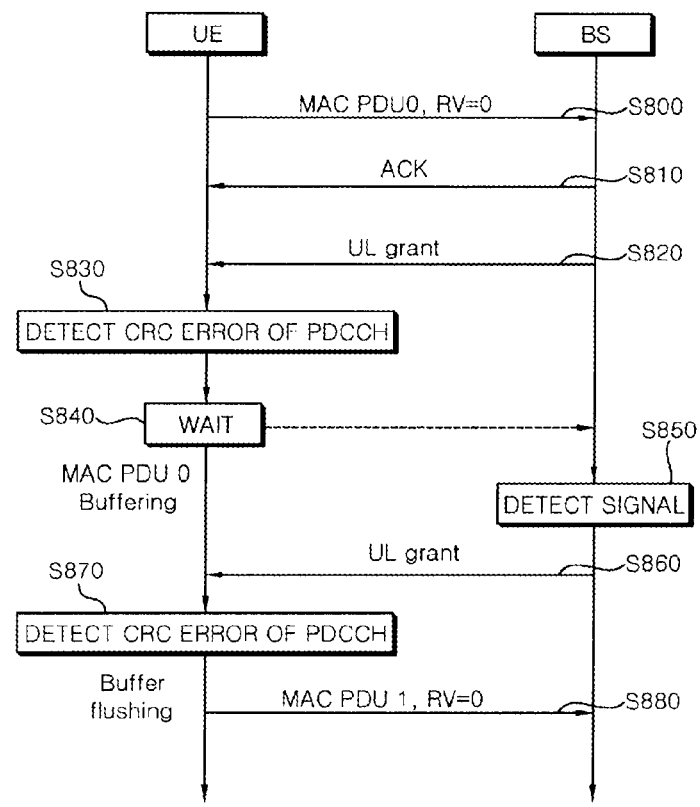
FIG. 10 is a flow diagram showing a data transmission method using HARQ according to another embodiment of the present invention.

FIG. 10 is a flow diagram showing a data transmission method using HARQ according to another embodiment of the present invention.

Referring to FIG. 10, a UE transmits a MAC PDU_0 (step S800). A redundancy version (RV) denotes a data transmission format for HARQ decoding. A value of the RV is updated or toggled in every data retransmission. Since the UE first transmits the MAC PDU_0, the RV is set to '0'.

The BS transmits an ACK signal (step S810), and transmits a UL grant on the PDCCH (step S820). In this case, the BS sets a flag to '1'. Meanwhile, since the UL grant is for transmission of the MAC PDU_1 that is new data, the RV included in the UL grant is '0'. As a result of detecting the CRC error of the PDCCH, it is assumed that the UE does not successfully receive the UL grant on the PDCCH (step S830). Since the CRC error is detected from the PDCCH, the UE waits for a certain period of time (step S840). That is, when the CRC error occurs in the PDCCH, the UE suspends data transmission until a TTN reaches a max Tx number while incrementing the TTN by 1 without attempting error detection from the ACK/NACK channel or without transmission of uplink data. This is because the UE cannot know a radio resource for transmitting uplink data since the UL grant is not correctly received due to the error of the PDCCH.

Meanwhile, the UE stores the previously transmitted MAC PDU_0 in a buffer. The buffer is a memory for storing the MAC PDU in a HARQ process. The UE does not discard the MAC PDU from the buffer even if the ACK signal is received. Therefore, when the MAC PDU is needed to be discontinuously transmitted due to the NACK-to-ACK error, the UE promptly retransmits the MAC PDU corresponding to an omitted sequence number so that a BS can deliver data to an upper layer without loss.

The BS tries to detect a signal (step S850). No signal is detected if the UE waits for a certain period of time. So the BS checks for the flag and then transmits a UL grant for transmission of the MAC PDU_1, that is, a UL grant for new transmission (step S860). It is assumed herein that the UL grant is transmitted before the TTN reaches the max Tx number.

If the UL grant for new transmission is received before the TTN reaches the max Tx number, the UE checks an CRC error of the PDCCH (step S870). Since there is no error in the PDCCH and the UL grant is received before the TTN reaches the max Tx number, the UE can know that there is no NACK-to-ACK error in an ACK signal previously received in response to the MAC PDU_0. Thus, the UE transmits the MAC PDU_1 and flushes the buffer (step S880). Since there is no CRC error in the PDCCH, the UE transmits the MAC PDU_1 by using a radio resource indicated by the UL grant. In this case, the UE flushes the buffer.

Figure 11:
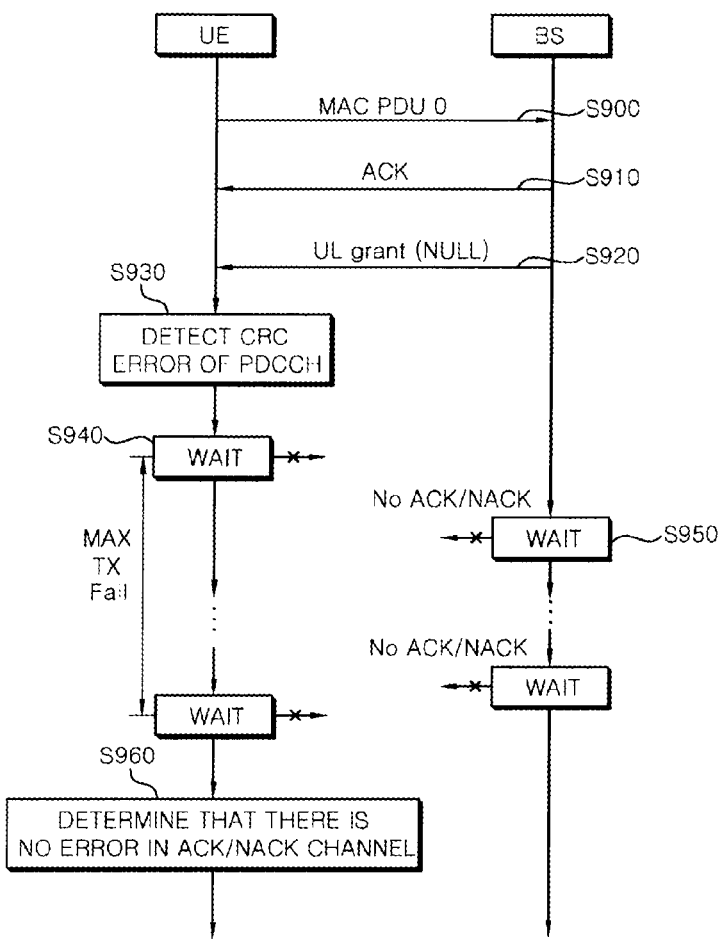
FIG. 11 is a flow diagram showing a data transmission method using HARQ according to another embodiment of the present invention.

FIG. 11 is a flow diagram showing a data transmission method using HARQ according to another embodiment of the present invention. This is a case where a UL grant (NULL) is transmitted to some of the UEs because radio resources are not enough to be assigned to all UEs in a cell, and a CRC error is detected from the PDCCH.

Referring to FIG. 11, a UE transmits a MAC PDU_0 to a BS (step S900). Since the UE first transmits the MAC PDU_0, the RV is set to '0'. The BS transmits an ACK signal (step S910). The UE receives the ACK signal. Since radio resources are assigned to another UE included in the cell as a result of scheduling of the BS, a UL grant (NULL) that is a UL grant excluding resource assignment information is transmitted to the UE through the PDCCH (step S920). In this case, the BS sets the flag to '0'.

The UE detects a CRC error of the PDCCH (step S930). Since the CRC error is detected from the PDCCH, the UE waits for a certain period of time (step S940). This is because the UE cannot transmit uplink data when the CRC error occurs in the PDCCH since the UE cannot know a UL grant to be transmitted. Meanwhile, the UE stores the previously transmitted MAC PDU_0 in a buffer. The data stored in the buffer is retransmitted when an error is detected from the ACK/NACK channel at a later time. The UE increments the TTN by 1 whenever transmission is suspended.

Since the BS does not assign an additional radio resource to the UE, there is no need to determine whether uplink data is received from the UE. That is, the BS waits without detecting a signal from the UE or without transmitting the ACK/NACK signal (step S950).

While incrementing the TTN by 1 as described above, if the UL grant is not transmitted from the BS until the TTN reaches the max Tx number, the UE determines that there is no error in the ACK signal in response to the MAC PDU_0 previously transmitted, and thus flushes the buffer (step S960). This is because, although a UL grant for retransmission has to be transmitted when the BS has transmitted the NACK signal, the UE has not received the UL grant before or after the TTN reaches the max Tx number.

FIG. 12 is a flow diagram showing a data transmission method using HARQ according to another embodiment of the present invention. This is a case where a CRC error of the PDCCH and a NACK-to-ACK error occur when a BS transmits a NACK signal and does not transmit a UL grant.

Referring to FIG. 12, a UE transmits a MAC PDU_0 (step S1000). In this case, an RV is set to '0'. The BS transmits a NACK signal but the UE erroneously receives an ACK signal due to the NACK-to-ACK error (step S1010). In this case, the UE keeps the MAC PDU_0 in the buffer and does not empty the buffer. The BS does not transmit the UL grant (step S1020). That is, the BS does not transmit a UE_ID (or a C-RNTI) of the UE through the PDCCH. In this case, the BS sets the flag to '0'.

The UE detects a CRC error of the PDCCH (steps S1030). Even if the PDCCH is successfully decoded, the UL grant for the UE is not transmitted. Since the buffer is not empty, the UE waits while incrementing the TTN by 1 until a TTN reaches a max Tx number (step S1040).

The BS tries to detect a signal (step S1050). Since the BS has transmitted a NACK signal, the BS expects to detect the signal generated by transmission of the MAC PDU_0. However, since the BS cannot detect the signal when the UE is in a suspension state, the BS checks for the flag. The BS transmits a UL grant for retransmission of the MAC PDU_0 through the PDCCH before the TTN reaches the max Tx number (step S1060).

It is assumed herein that the UE cannot detect the CRC error of the PDCCH (step S1070). That is, as a result of successful decoding of the PDCCH, the UE receives a UL grant for retransmission of the MAC PDU_0 before the TTN reaches the max Tx number. Therefore, the UE can know that the NACK-to-ACK error occurs in step S1010. Accordingly, the UE retransmits the MAC PDU_0 according to the UL grant for retransmission (step S1080). In this case, the RV is set to '1'.

The aforementioned data transmission method considering an error of a downlink control channel can also be equally applied in the following cases.

For example, a measurement gap may be determined through radio resource control (RRC) signaling. The measurement gap is a duration in which a UE performs cell search for inter-radio access technology (inter-RAT) and/or inter-frequency handover. The UE cannot decode a PDCCH in the measurement gap since the UE performs cell search. Therefore, the UE confirms an ACK/NACK signal as an ACK signal when the ACK/NACK signal is received in a TTI corresponding to the measurement gap, and remains in a suspension state. Thereafter, the UE is released from the suspension state by receiving a UL grant through the PDCCH and then resumes transmission.

For another example, if at lease one of resource blocks to be used in retransmission of a MAC PDU is included in a resource block to be used in transmission of preambles of a random access channel (RACH), the UE cancels transmission attempt, confirms an ACK/NACK signal of a corresponding TTI as an ACK signal, and remains in a suspension state. Thereafter, the UE is released from the suspension state by receiving a UL grant through the PDCCH and then resumes transmission.

All functions described above may be performed by a processor such as a micro-processor, a controller, a microcontroller, and an application specific integrated circuit (ASIC) according to software or program code for performing the functions. The program code may be designed, developed, and implemented on the basis of the descriptions of the present invention, and this is well known to those skilled in the art.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of transmitting data using hybrid automatic repeat request (HARQ), the method comprising:
   sending, by a user equipment (UE), an uplink transmission;
   receiving, by the UE, a HARQ feedback, which is an acknowledgement (ACK) signal or a negative-acknowledgement (NACK) signal, corresponding to the uplink transmission;
   if the UE receives the ACK signal, determining, by the UE, whether the UE detects a physical downlink control channel (PDCCH) associated with its UE-identification (UE-ID); and
   if the UE does not detect the PDCCH associated with the UE-ID, keeping, by the UE, uplink data associated with the uplink transmission in a buffer after receiving the ACK signal until an uplink grant is received from a base station (BS), and sending an uplink retransmission, by the UE, after receiving the uplink grant from the base station indicating retransmission,
   wherein a redundancy version (RV) indicating a first value is used for the uplink transmission, and a RV indicating a second value different from the first value is used for the uplink retransmission.

2. The method of claim 1, wherein the UE-ID includes a cell-radio network temporary identifier (C-RNTI) of the UE.

3. The method of claim 1, wherein the HARQ feedback is received via a physical HARQ indicator channel (PHICH).

4. The method of claim 1, wherein the PDCCH is periodically transmitted by the BS to the UE.

5. The method of claim 1, further comprising:
   incrementing a transmission trial number (TTN) by 1 after keeping the uplink data associated with the uplink transmission; and
   incrementing the TTN by 1 after sending the uplink retransmission.

6. The method of claim 1, further comprising: incrementing a transmission trial number (TTN) by 1 after sending the uplink retransmission.

7. A user equipment (UE) for transmitting data using hybrid automatic repeat request (HARQ), the UE comprising:
   a radio unit; and
   a processor coupled to the radio unit and configured to:
   send an uplink transmission;
   receive a HARQ feedback, which is an acknowledgement (ACK) signal or a negative-acknowledgement (NACK) signal, corresponding to the uplink transmission;
   if the UE receives the ACK signal, determine whether the UE detects a physical downlink control channel (PDCCH) associated with its UE-identification (UE-ID); and
   if the UE does not detect the PDCCH associated with the UE-ID, keep uplink data associated with the uplink transmission in a buffer after receiving the ACK signal until an uplink grant is received from a base station (BS), and send an uplink retransmission after receiving the uplink grant from the base station indicating retransmission,
   wherein a redundancy version (RV) indicating a first value is used for the uplink transmission, and a RV indicating a second value different from the first value is used for the uplink retransmission.

8. The user equipment (UE) of claim 7, wherein the UE-ID includes a cell-radio network temporary identifier (C-RNTI) of the UE.

9. The user equipment (UE) of claim 7, wherein the HARQ feedback is received via a physical HARQ indicator channel (PHICH).

10. The user equipment (UE) of claim 7, wherein the PDCCH is periodically transmitted by the BS to the UE.

11. The user equipment (UE) of claim 7, wherein the processor is further configured to:
   increment a transmission trial number (TTN) by 1 after keeping the uplink data associated with the uplink transmission; and
   increment the TTN by 1 after sending the uplink retransmission.

12. The user equipment (UE) of claim 7, wherein the processor is further configured to:
   increment a transmission trial number (TTN) by 1 after sending the uplink retransmission.

* * * * *